United States Patent
Blakeman

(10) Patent No.: US 8,905,670 B1
(45) Date of Patent: Dec. 9, 2014

(54) SNAP-FIT JOINT FOR PLASTIC FRAME ELEMENTS AND FRAMES FORMED THEREBY

(75) Inventor: Rex Blakeman, Michigan Center, MI (US)

(73) Assignee: APQ Development, LLC

( * ) Notice: Subject to any disclaimer, the term of this patent is extended or adjusted under 35 U.S.C. 154(b) by 244 days.

(21) Appl. No.: 12/895,119

(22) Filed: Sep. 30, 2010

Related U.S. Application Data

(60) Provisional application No. 61/247,355, filed on Sep. 30, 2009.

(51) Int. Cl.
*B25G 3/08* (2006.01)

(52) U.S. Cl.
USPC ........ 403/381; 403/263; 403/361; 297/440.1; 297/440.22

(58) Field of Classification Search
CPC ...... F16B 12/125; F16B 12/26; F16B 5/0052; A47C 4/021; A47C 13/005
USPC .......... 403/253, 263, 361, 381, 254; 297/440.1, 451.11, 440.16, 440.14, 297/440.2, 440.22
See application file for complete search history.

(56) References Cited

U.S. PATENT DOCUMENTS

| | | | | |
|---|---|---|---|---|
| 879,382 A | * | 2/1908 | Harris | 403/276 |
| 3,801,054 A | * | 4/1974 | Glowacki | 248/188.7 |
| 4,117,784 A | * | 10/1978 | Piretti | 108/150 |
| 4,261,138 A | * | 4/1981 | St. George Syms | 47/40.5 |
| 4,900,090 A | * | 2/1990 | Davis | 297/440.1 |
| 5,319,901 A | * | 6/1994 | Goldsworthy et al. | 52/651.02 |
| 5,439,269 A | * | 8/1995 | Cheng | 297/440.1 |
| 6,032,590 A | * | 3/2000 | Chen | 108/158.12 |
| 6,149,240 A | * | 11/2000 | Pietrzak | 297/440.22 |
| 6,367,749 B2 | * | 4/2002 | Valiulis | 248/188 |
| 6,402,420 B1 | * | 6/2002 | Yang | 403/381 |
| 6,450,107 B1 | * | 9/2002 | Sanz Novales | 108/153.1 |
| 6,659,677 B1 | * | 12/2003 | Exposito | 403/24 |
| 7,234,780 B2 | * | 6/2007 | Lipniarski | 297/461 |
| 7,472,969 B2 | * | 1/2009 | Saravis | 312/111 |
| 7,886,674 B2 | * | 2/2011 | Behnke | 108/150 |
| 8,016,144 B2 | * | 9/2011 | Obergoenner | 217/65 |
| 8,132,519 B2 | * | 3/2012 | Behnke | 108/150 |
| 2005/0089367 A1 | * | 4/2005 | Sempliner | 403/381 |
| 2006/0165482 A1 | * | 7/2006 | Olberding | 403/381 |
| 2007/0125929 A1 | * | 6/2007 | Behnke | 248/558 |
| 2012/0107042 A1 | * | 5/2012 | Schneider | 403/343 |

* cited by examiner

*Primary Examiner* — Michael P Ferguson
*Assistant Examiner* — Matthew R McMahon
(74) *Attorney, Agent, or Firm* — Honigman Miller Schwartz and Cohn LLP

(57) ABSTRACT

A snap-fit joint comprises plastic male and female members. The male member has a flexible wall shaped along its length to define a terminal anchor portion and a relatively narrower neck portion defined by opposing curved indentations of the wall. The opposing curved indentations taper inwardly from a top to a bottom, such that the distance between opposing curved indentations of the wall is least at the bottom of the wall and greatest at the top. The female member comprises a socket corresponding in shape to that of the male member. As the male member is inserted into the socket, the curved indentations of the male member are flexed inwardly until the male member is seated in the socket.

17 Claims, 5 Drawing Sheets

US 8,905,670 B1

SNAP-FIT JOINT FOR PLASTIC FRAME ELEMENTS AND FRAMES FORMED THEREBY

CROSS-REFERENCE TO RELATED APPLICATIONS

This application is related to, and claims the benefit of priority from, U.S. Provisional Patent Application Ser. No. 61/247,355 filed 30 Sep. 2009, the disclosure of which application is incorporated herein by reference in its entirety.

FIELD OF THE INVENTION

The present invention pertains to snap-fit joints for plastic frame elements, as well as frames formed with such joints, and more specifically to such joints as are each characterized by a male member and a corresponding female member, the male member being resiliently flexible for temporary deformation during insertion into the female member.

BACKGROUND

Various types of joints are known for interconnecting two or more separate parts. In the realm of plastic products more particularly, numerous snap-fit joints have heretofore been devised, although all are attended by various drawbacks. There is, accordingly, a continued need for a snap-fit joint for plastic frame elements, as well as frames formed thereby, that are at once simple in their manufacture and construction yet characterized by acceptable strength.

SUMMARY

The present invention comprehends a snap-fit joint for connecting at least first and second plastic frame elements, as well as frames formed with such joints, the snap-fit joint comprising each of at least one plastic male member and at least one plastic female member.

The plastic male member includes a continuous upstanding, resiliently flexible wall with a top and a bottom. The wall is shaped to define a terminal anchor portion and a relatively narrower neck portion defined by opposing regions of the wall. The neck portion is characterized in that the opposing regions of the wall defining the narrower neck portion taper inwardly from the top of the wall to the bottom of the wall, such that the distance between opposing regions of the wall is least proximate the bottom of the wall and greatest proximate the top of the wall. The top of the wall defines an insertion end of the male member.

The plastic female member includes a socket corresponding in shape to the shape of the male member. The socket is defined by an upstanding wall having a top and a bottom, the bottom of the upstanding wall bounding an opening to the socket. The wall further defines portions corresponding to each of the terminal anchor portion and relatively narrower neck portion of the male member. The neck portion of the socket of the female member is still further characterized in that opposing regions of the wall defining the narrower neck portion taper inwardly from the top of the wall to the bottom of the wall, such that the distance between opposing regions of the wall is least proximate the bottom of the wall and greatest proximate the top of the wall. One or more tabs extend from proximate the bottom of the wall toward the socket.

The male member is insertable, insertion end first, into the opening of the socket of the female member. As the male member is so inserted into the opening of the socket, the opposing regions of the wall defining the neck portion of the male member are flexed inwardly until the wall defining the male member is clear of the one or more tabs of the female member, whereupon the opposing regions of the wall of the male member return to an unflexed shape.

The present invention further comprehends a plastic framework comprising at least two plastic frame members interconnected by a snap-fit joint such as summarized above and hereafter described.

BRIEF DESCRIPTION OF THE DRAWINGS

For a better understanding of the invention, and to show more clearly how it may be carried into effect according to one or more embodiments thereof, reference will now be made, by way of example, to the accompanying drawings, showing exemplary embodiments of the present invention and in which.

WRITTEN DESCRIPTION

Figure 1:
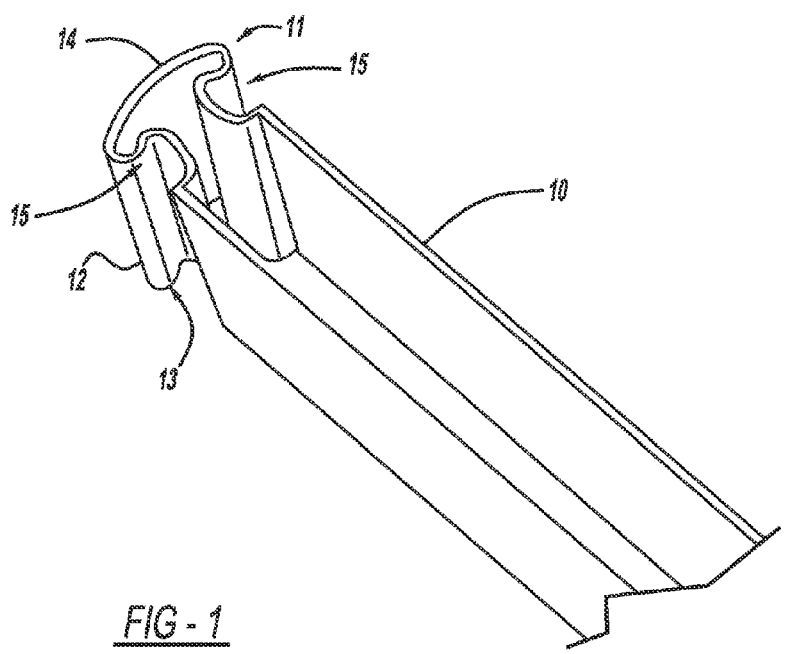
FIG. 1 is a detailed perspective view of a plastic male member, shown incorporated into an exemplary frame element.

As required, a detailed embodiment of the present invention is disclosed herein. However, it is to be understood that the disclosed embodiment is merely exemplary of the invention that may be embodied in various and alternative forms. Therefore, specific structural and functional details disclosed herein are not to be interpreted as limiting, but merely as a representative basis for teaching one skilled in the art to variously employ the present invention.

The accompanying drawings are not necessarily to scale, and some features may be exaggerated or minimized to show details of particular components.

Referring now to the drawings, wherein like numerals refer to like or corresponding parts throughout the several views, the present invention is generally characterized as a snap-fit joint for connecting at least first and second plastic frame elements.

Figure 2:
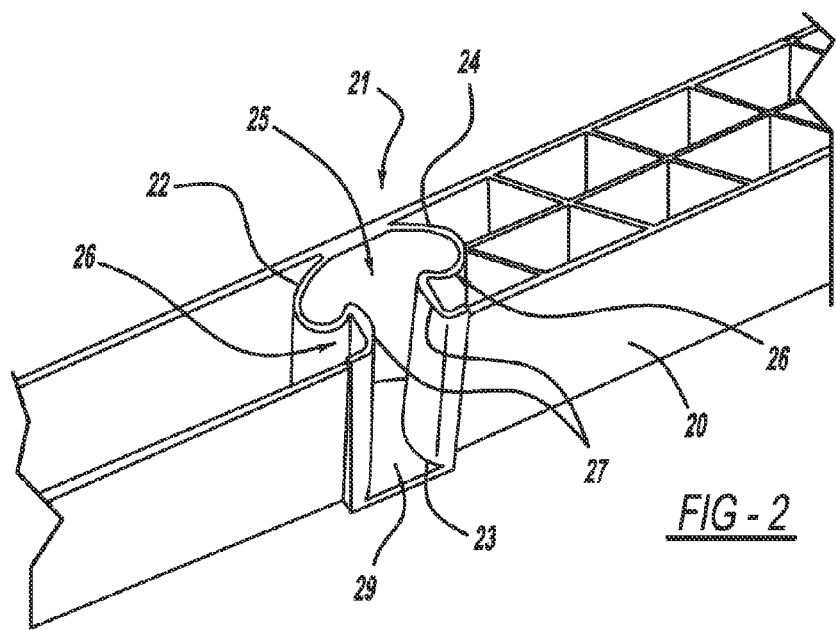
FIG. 2 is a detailed perspective view of a plastic female member, shown incorporated into an exemplary frame element.
Figure 3:
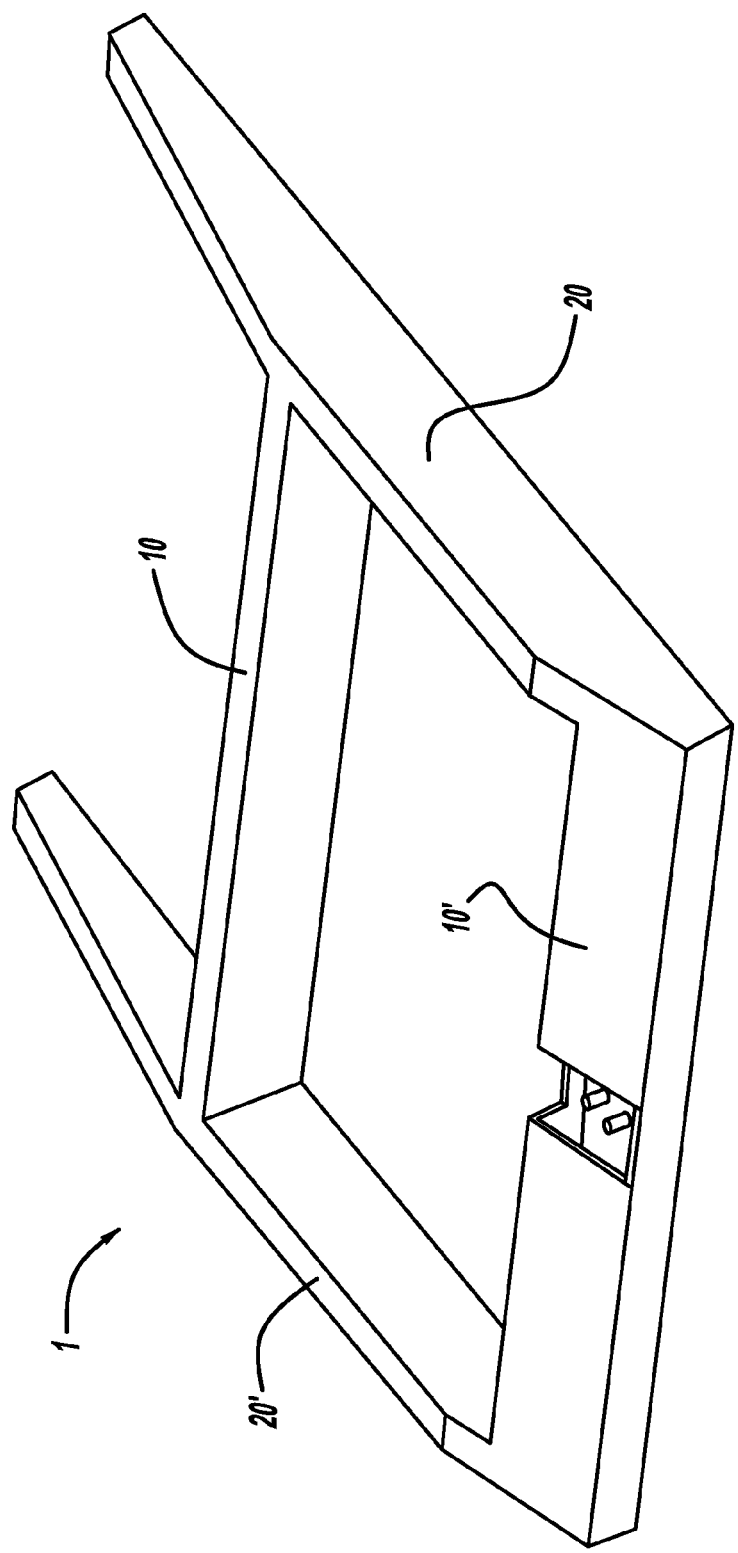
FIG. 3 is a top-down perspective view of an exemplary plastic framework comprised of plastic frame elements interconnected by snap-fit joints in accordance with the present invention.
Figure 4:
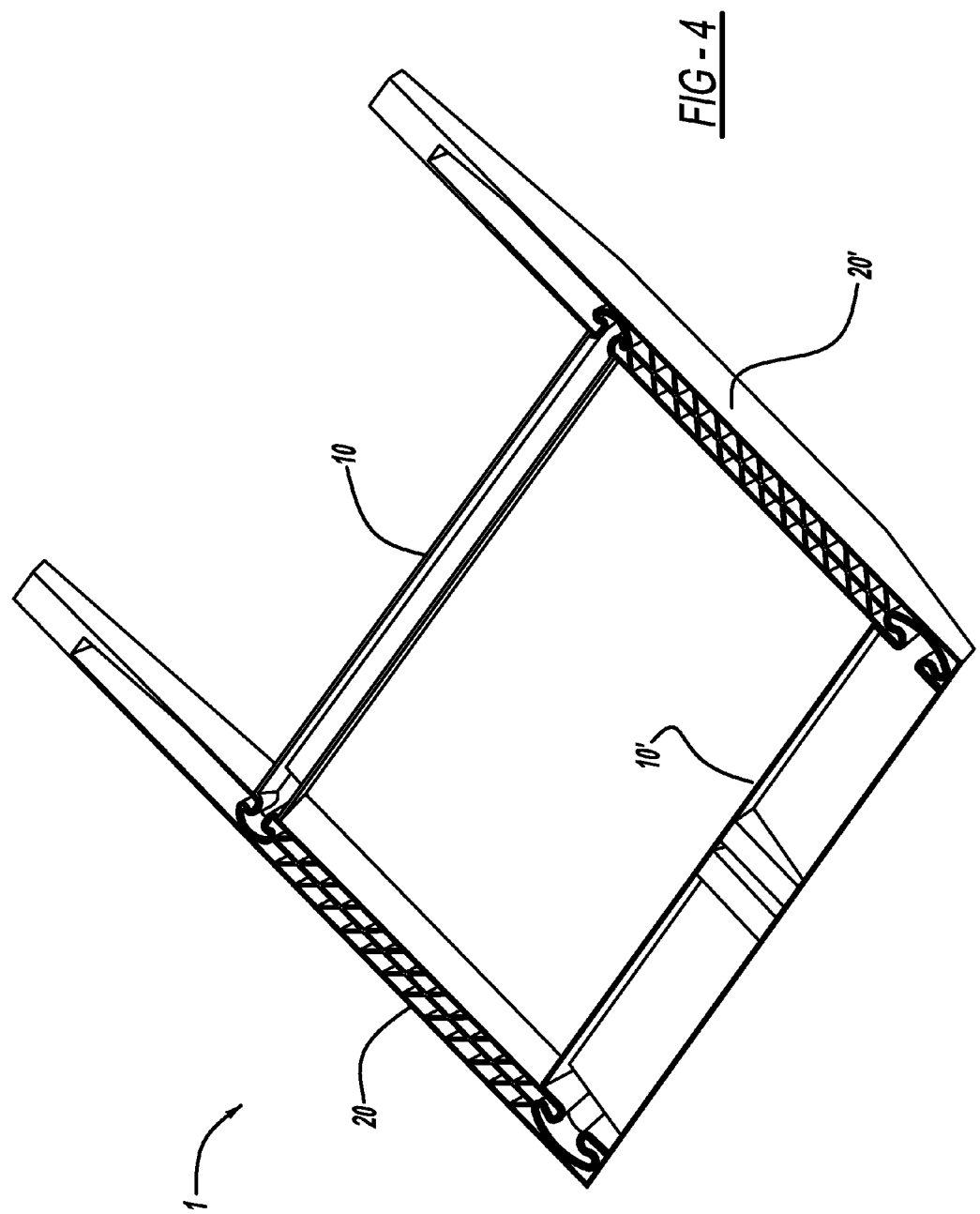
FIG. 4 is a bottom-up perspective view of the exemplary plastic framework of FIG. 3.
Figure 5:
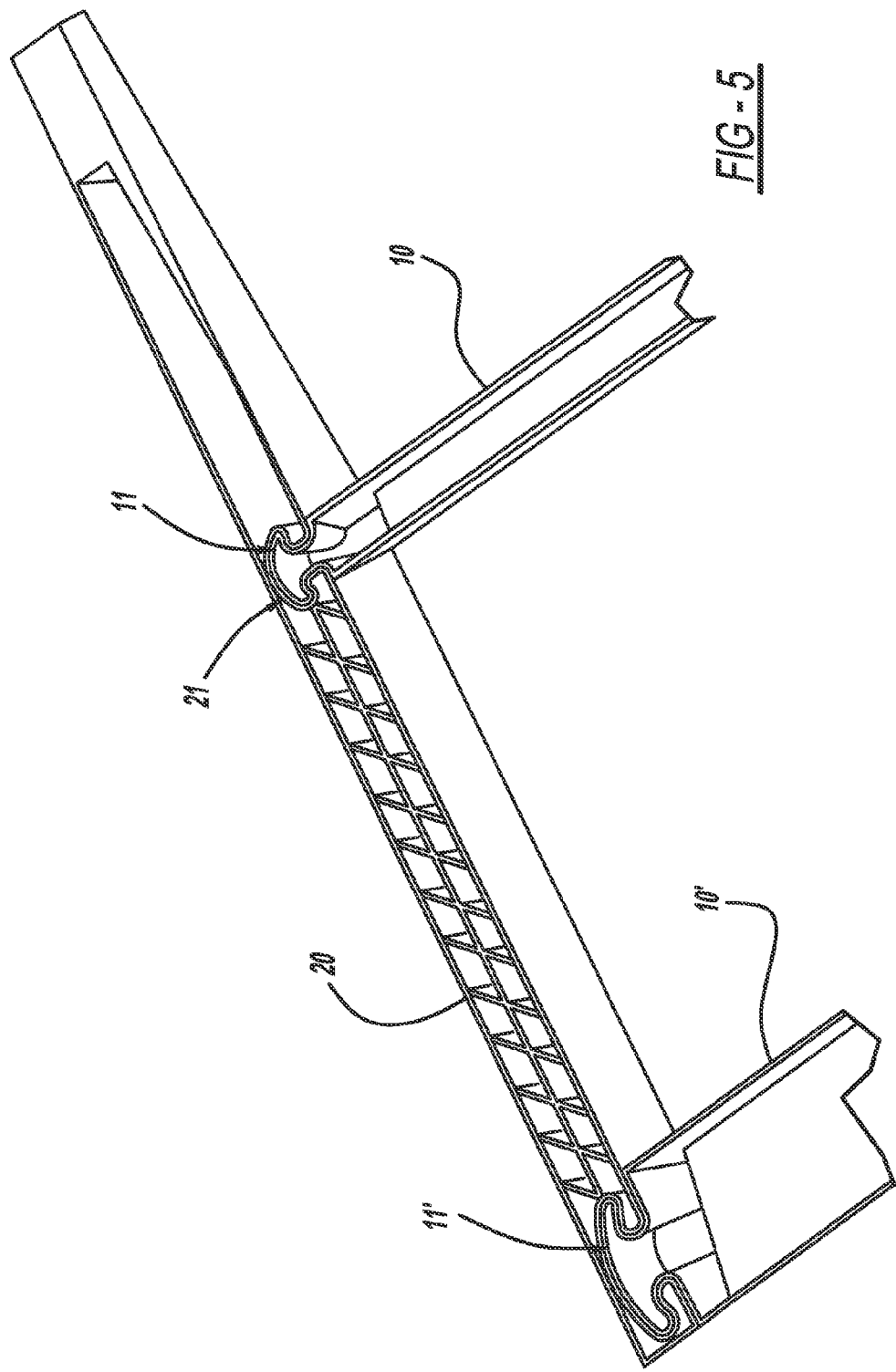
FIG. 5 is a detailed view of the exemplary framework of FIG. 3, showing particularly the interconnection of three separate frame elements (10, 10' and 20) via the snap-fit joint of the present invention.

Generally, the snap-fit joint comprises a plastic male member (indicated generally at 11) provided on at least a first frame element 10 (FIG. 1) and a plastic female member (indicated generally at 21) provided on at least a second frame element 20 (FIG. 2). As shown in the drawings, joints of this invention may be provided on two or even more frame elements, such as the multiple frame elements 10, 10', 20 and 20' comprising the chair-base framework 1 of the exemplary embodiment, and best shown in FIGS. 3 and 4. However, it is contemplated that the inventive snap-fit joint described herein may be employed in the interconnection of two or more frame elements in the construction of any of a variety of frameworks, wherein the said snap-fit joint may be substituted for, or used in combination with, other, conventional joints or joining means.

Referring again to FIG. 1, the plastic male member 11 can be seen to more particularly comprise a continuous upstanding, resiliently flexible wall 12 with a top 13 and a bottom 14. The wall 12 is shaped to define an anchor portion disposed at the terminal end of the frame element 10 and taking the cross-sectional form, in the illustrated embodiment, of a "C." As will be appreciated from this disclosure, the shape of the anchor portion need not be restricted to the form of the illustrated embodiment.

Between the anchor portion and the frame element 10, the wall 12 is further shaped to define a pair of opposing indentations 15 that together form a relatively narrower neck portion of the male member 11. The neck portion is characterized in that the opposing regions of the wall 12 defining the opposing indentations 15 taper inwardly from the top 13 of the wall to the bottom 14 of the wall, such that the distance between these opposing regions of the wall 12 defining indentations 15 is least proximate the bottom 14 and greatest proximate the 13 top of the wall.

Figure 6:
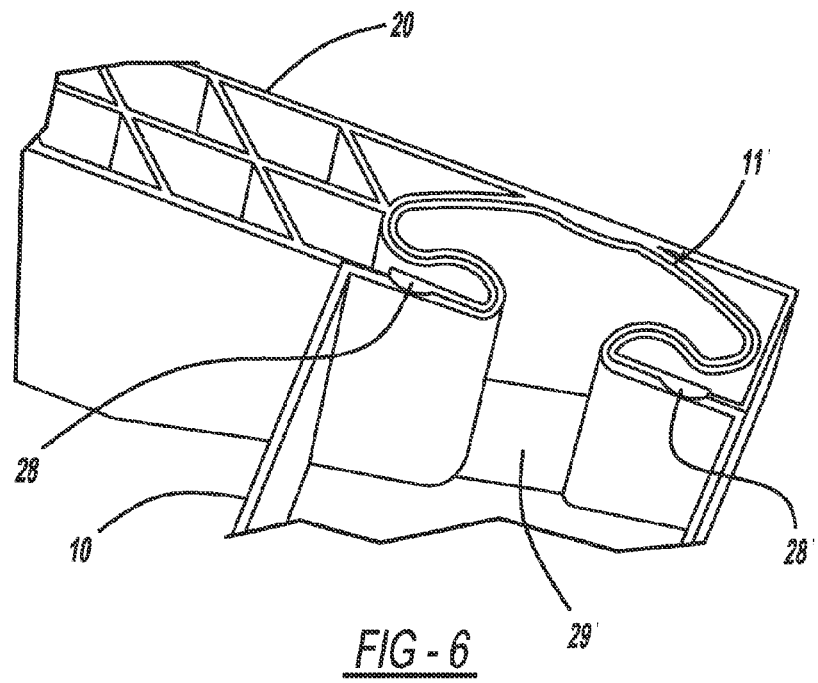
FIG. 6 is a detailed perspective view depicting engagement between a first pair of male and female members in the exemplary framework.

It may be seen from FIGS. 1 and 6 that the male member 11 is defined solely by the upstanding wall 12, and thus lacks any overlying top or bottom walls. As those skilled in the art will appreciate, this construction lends itself (in combination with the shape of the wall 12) to the resilient flexibility of the wall.

As shown in the illustrated embodiment, the male member 11 and the frame element 10 are monolithic, being formed, for instance, by injection molding or the like. It will be understood that the present invention is not intended to be so limited, and it is thus contemplated that the male member may be separately formed and thereafter connected to a frame element. Similarly, it is contemplated that the male member may be positioned at any one or more locations on a frame element (e.g., 10) of any desired overall configuration, even though, in the exemplary embodiment, the male members are shown as being disposed at the terminal ends of a linear frame element 10 of three-walled construction.

Referring next to FIG. 2, the plastic female member 21 includes a socket corresponding in shape to the shape of the male member 11 (not shown), the socket defined by an upstanding wall 22 having a top 23 and a bottom 24. The bottom 24 of upstanding wall 22 bounds an opening 25 to the socket.

Consistent with its corresponding shape, wall 22 is further shaped to define portions corresponding to each of the terminal anchor portion and relatively narrower neck portion of the male member 11, the neck portion being more particularly defined by a pair of opposing indentations 26. The neck portion is characterized in that the opposing regions of the wall 22 defining the opposing indentations 26 taper inwardly from the top 23 of the wall to the bottom 24 of the wall, such that the distance between these opposing regions of the wall 22 defining indentations 26 is least proximate the bottom 24 and greatest proximate the top 23 of the wall.

Figure 7:
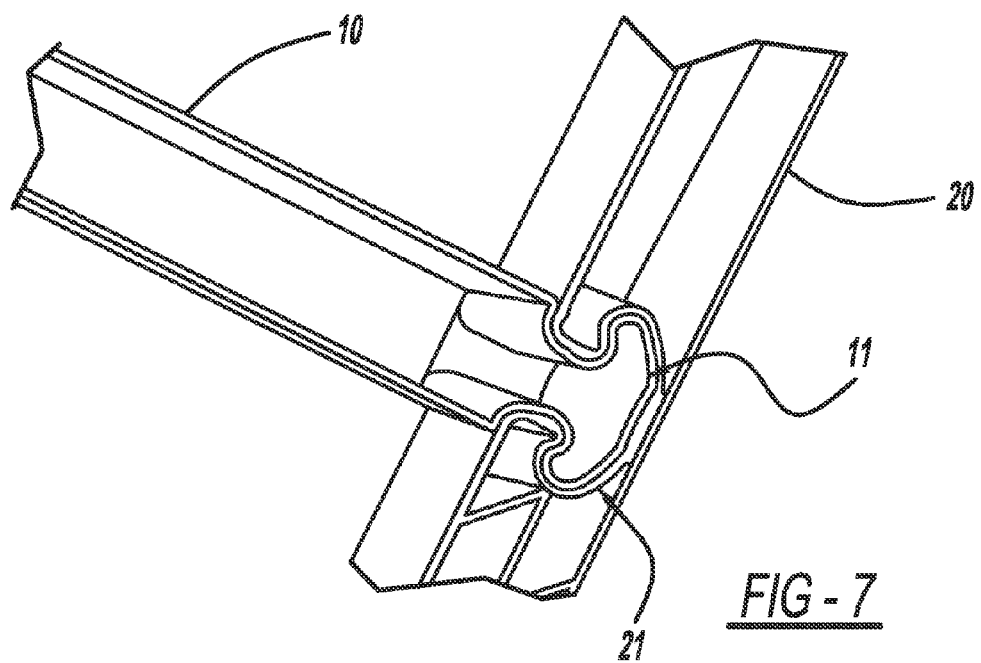
FIG. 7 is a detailed perspective view depicting engagement between a second pair of male and female members in the exemplary framework.

As shown best in FIGS. 2, 6 and 7, the plastic female member 21 further includes one or more tabs 27 extending from the bottom 24 of the wall 22 and toward the socket to thereby project into the socket. As also shown (FIG. 6), one or more tabs 28 may also be provided which project away from the socket and the frame element 20, these tabs 28 serving to overlie the frame element 10 upon interconnection of the first 10 and second 20 frame elements as hereafter described.

It may be seen from FIG. 2 that the female member 21 is defined by the upstanding wall 22 as well as a wall 29 disposed proximate the top 23 of wall 22 and forming an end of the socket. This wall 29 may, as shown best in FIG. 2, be common to the female member and the frame element 20 in which the female member 21 is disposed. Alternatively, it may be a separate wall (such as, for instance, where the frame element 20 is such that it includes no corresponding wall).

As shown in the illustrated embodiment, the female member 21 and the frame element 20 are monolithic, being formed, for instance, by injection molding or the like. It will be understood that the present invention is not intended to be so limited, and it is thus contemplated that the female member may be separately formed and thereafter disposed in or on a frame element. Similarly, it is contemplated that the female member may be positioned at any one or more locations on a frame element of any desired overall configuration, even though, in the exemplary embodiment, the female members are shown as being disposed intermediate the terminal ends of a linear frame element 20 of three-walled construction.

In operation, the male member 11 is inserted down into the socket of the female member 21 in lock-and-key fashion. To this end, the top 13 of the wall 12 defines an insertion end of the male member 11, this insertion end being inserted into the opening of the socket.

By reason of the aforedescribed design, as the male member 11 is urged down into the socket, the opposing indentations 15 of the wall 12 defining the neck portion of the male member are flexed inwardly as they confront the relatively narrower dimensions of the wall 22 between the indentations 26 proximate the bottom 24 of the female member 21. As the male member 11 continues to be urged into the socket of the female member, the successive areas of the neck portion of the male member confronting the relatively narrower dimensions of the wall 22 between the indentations 26 proximate the bottom 24 will become increasing narrower, owing to the corresponding shapes of the socket and the male member, thereby correspondingly reducing the force tending to flex the wall 12 inwardly until, finally, the bottom 14 of wall 12 is clear of the one or more tabs 27 (and, optionally, 28) of the female member 21, whereupon the male member 11 is fully seated in the socket of the female member and the wall 12 of the male member is able to return to its default, unflexed shape (as shown in FIG. 1).

In the fully seated condition of the male member, shown in FIGS. 4 through 7, the male member 11 is trapped in the socket of the female member by the tabs 27 which in this condition extend over the upper edge of the bottom 14 of wall 12 defining the male member. Furthermore, and as best shown in FIG. 7, the optional tabs 28 may augment this trapped condition by extending over the end wall of the frame element 10.

Owing to the shape of the anchor portion of the male member 11, the male member is further restrained against being laterally withdrawn from the socket of the female member 21. According to this configuration, including the close conformity between the shape of the male member 11 and the shape of the socket of the female member, it is not possible to remove the male member without physical impairment of the joint.

In view of the foregoing disclosure, it will be understood that configurations of the male and female members of the inventive snap-fit joint other than as described may be readily adopted, subject only to the requirement that such alternative configurations effect a temporary flexing or deformation of the male or female member to achieve the interconnection herein described. Thus, for instance, it is contemplated that the male and female members may be configured to effect flexing of the wall of the male member at locations other than the neck portion.

The foregoing description of the exemplary embodiment of the invention has been presented for purposes of illustration and description. It is not intended to be exhaustive of, or to limit, the invention to the precise form disclosed, and modification and variations are possible in light of the above teachings or may be acquired from practice of the invention. The embodiment shown and described in order to explain the principles of the invention and its practical application to enable one skilled in the art to utilize the invention in various embodiments and with various modifications as are suited to the particular application contemplated. Accordingly, all such modifications and embodiments are intended to be included within the scope of the invention. Other substitutions, modifications, changes and omissions may be made in the design, operating conditions, and arrangement of the exemplary embodiments without departing from the spirit of the present invention.

The invention in which an exclusive property or privilege is claimed is defined as follows:

1. A snap-fit joint for connecting at least first and second plastic frame members, the snap-fit joint comprising:
a plastic male member having an upstanding, resiliently flexible wall having a top and a bottom defining a vertical orientation, the wall shaped along its length to define a terminal anchor portion and a relatively narrower neck portion comprising curved indentations having opposing regions of the wall tapering inwardly from top to bottom, such that the distance between the opposing regions of the wall in the curved indentations decreases from top to bottom;
a plastic female member defining a socket having a complimentary shape to the male member to receive the male member, the socket defined by an upstanding wall having a top and a bottom, the bottom of the upstanding wall defining a mouth of the socket and a channel opening corresponding to the shape of the neck portion of the male member; and
tabs extending from the bottom of the upstanding wall of the plastic female member from opposing sides of the channel opening into the mouth of the socket and arranged to overlie the neck portion at the bottom of the wall of the male member when the male member is fully seated in the socket of the female member, the tabs retaining the fully seated male member in the socket of the female member;
wherein the curved indentations of the male member are configured to flex inwardly so as to allow the top of the male member to be inserted into the mouth of the socket until the male member is seated in the socket of the female member,
wherein when the male member is fully seated in the socket of the female member, the tabs snap over the neck portion of the male member.

2. The snap-fit joint of claim 1, wherein the wall of the male member is a continuous wall.

3. The snap-fit joint of claim 2, wherein the male member is defined solely by the wall thereof.

4. The snap-fit joint of claim 1, wherein the wall of the female member is a continuous wall.

5. The snap-fit joint of claim 1, wherein the opposing regions of the wall of the male member in the narrower neck portion extend inward toward each other.

6. A plastic framework comprising:
at least two plastic flame elements interconnectable by a snap-fit joint, the snap-fit joint comprising:
a plastic male member on one of the at least two plastic frame elements, the male member having an upstanding, resiliently flexible wall having a top and a bottom defining a vertical orientation, the wall shaped along its length to define a terminal anchor portion and a relatively narrower neck portion comprising curved indentations having opposing regions of the wall tapering inwardly from top to bottom, such that the distance between the opposing regions of the wall in the curved indentations decreases from top to bottom;
a plastic female member provided on the other of the at least two plastic frame elements, the female member defining a socket having a complimentary shape to the male member to receive the male member, the socket defined by an upstanding wall having a top and a bottom, the bottom of the upstanding wall defining a mouth of the socket and a channel opening corresponding to the shape of the neck portion of the male member; and
tabs extending from the bottom of the upstanding wall of the plastic female member from opposing sides of the channel opening into the mouth of the socket and arranged to overlie the neck portion at the bottom of the wall of the male member when the male member is fully seated in the socket of the female member, the tabs retaining the fully seated male member in the socket of the female member;
wherein the curved indentations of the male member are configured to flex inwardly so as to allow the top of the male member to be inserted into the mouth of the socket until the male member is seated in the socket of the female member,
wherein when the male member is fully seated in the socket of the female member, the tabs snap over the neck portion of the male member.

7. The plastic framework of claim 6, wherein the wall of the male member is a continuous wall.

8. The plastic framework of claim 7, wherein the male member is defined solely by the wall thereof.

9. The plastic framework of claim 6, wherein the wall of the female member is a continuous wall.

10. The plastic framework of claim 6, wherein the male member and one of the at least two plastic frame elements are monolithic, and the female member and the other of the at least two plastic frame elements are monolithic.

11. The plastic framework of claim 10, wherein the male member is defined solely by the wall thereof.

12. The plastic framework of claim 11, wherein the wall of the male member is a continuous wall.

13. The plastic framework of claim 12, wherein the snap-fit joint comprises one or more tabs projecting away from the socket of the female member, the one or more tabs positioned at the bottom of the wall of the socket such that, when the male member is seated in the socket of the female member, the one or more tabs overlie the one of the at least two plastic frame elements having the male member provided thereon.

14. The plastic framework of claim 13, wherein the wall of the female member is a continuous wall.

15. The plastic framework of claim 6, wherein the male member is a separate element connected to one of the at least two plastic frame elements, and the female member is a separate element connected to the other of the at least two plastic frame elements.

16. The plastic framework of claim 6, wherein further the snap-fit joint comprises one or more tabs projecting away from the socket of the female member, the one or more tabs positioned at the bottom of the wall of the socket such that, when the male member is seated in the socket of the female member, the one or more tabs overlie the one of the at least two plastic frame elements having the male member provided thereon.

17. The plastic framework of claim 6, wherein the plastic framework defines the base of a chair.

\* \* \* \* \*